(12) United States Patent
Gesuita

(10) Patent No.: US 9,778,013 B2
(45) Date of Patent: Oct. 3, 2017

(54) APPARATUS AND METHOD FOR MEASURING A BENDING ANGLE OF A WORKPIECE

(71) Applicant: Salvagnini Italia S.p.A., Sarego (IT)

(72) Inventor: Enzo Gesuita, Selvazzano Dentro (IT)

(73) Assignee: Salvagnini Italia S.p.A. (IT)

( * ) Notice: Subject to any disclaimer, the term of this patent is extended or adjusted under 35 U.S.C. 154(b) by 253 days.

(21) Appl. No.: 14/490,743

(22) Filed: Sep. 19, 2014

(65) Prior Publication Data

US 2016/0040973 A1    Feb. 11, 2016

(30) Foreign Application Priority Data

Aug. 7, 2014 (EP) ..................................... 14180228

(51) Int. Cl.
 *G01B 5/24* (2006.01)
 *B21D 5/00* (2006.01)
 (Continued)

(52) U.S. Cl.
 CPC .............. *G01B 5/24* (2013.01); *B21D 5/006* (2013.01); *G01B 21/22* (2013.01); *G01C 19/5712* (2013.01)

(58) Field of Classification Search
 CPC ...... G01B 5/24; G01B 21/22; G01C 19/5712; B21D 5/006
 (Continued)

(56) References Cited

U.S. PATENT DOCUMENTS

| | | | | |
|---|---|---|---|---|
| 3,769,710 A | * | 11/1973 | Reister | G01C 21/165 244/175 |
| 4,564,765 A | * | 1/1986 | Blaich | B21D 5/02 250/559.08 |

(Continued)

FOREIGN PATENT DOCUMENTS

| | | |
|---|---|---|
| EP | 1202032 A1 | 5/2002 |
| EP | 1204845 | 5/2002 |

(Continued)

OTHER PUBLICATIONS

Aminian K., et al, "A New Approach to Accurate Measurement of Uniaxial Joint Angles Based on a Combination of accelerometers and Gyroscopes," IEEE Transactions on Biomedical Engineering, Aug. 1, 2005, pp. 1478-1484, vol .52, No. 8, IEEE Service Center, Piscataway, NJ.

*Primary Examiner* — R. A. Smith
*Assistant Examiner* — Tania Courson
(74) *Attorney, Agent, or Firm* — Laubscher Spendlove & Laubscher, P.C.

(57) ABSTRACT

An apparatus for measuring a bending angle between two portions of a workpiece in a bending machine includes at least a motion sensor unit provided with a gyroscope sensor, a processing unit connected with the gyroscope sensor and a coupling device for connecting the motion sensor unit with a portion of the workpiece to be bent. During a bending operation of the workpiece the gyroscope sensor measures at least one angular velocity and a related rotation angle of the portion according to an axis and the processing unit receives data from the gyroscope sensor regarding the rotation angle in order to calculate the bending angle as a function of the rotation angle.

19 Claims, 7 Drawing Sheets

(51) Int. Cl.
*G01B 21/22* (2006.01)
*G01C 19/5712* (2012.01)

(58) Field of Classification Search
USPC .......... 33/1 PT, 1 N, 534, 706, 707; 72/31.1, 72/31.11, 37
See application file for complete search history.

(56) References Cited

U.S. PATENT DOCUMENTS

| | | | | |
|---|---|---|---|---|
| 5,103,488 A | * | 4/1992 | Gemello | G06K 9/66 348/26 |
| 5,375,340 A | * | 12/1994 | Gerritsen | G01B 5/24 33/1 N |
| 5,761,940 A | * | 6/1998 | Moore, Jr. | B21D 5/002 72/19.4 |
| 5,899,964 A | * | 5/1999 | Ooenoki | B21D 5/02 382/141 |
| 5,941,116 A | * | 8/1999 | Kunze | B21D 5/04 72/306 |
| 6,522,445 B1 | * | 2/2003 | Kleytman | G02B 26/0833 248/476 |
| 6,708,541 B1 | * | 3/2004 | Matsumoto | B21D 5/006 72/31.1 |
| 6,922,903 B2 | * | 8/2005 | Horn | B21D 5/002 33/1 N |
| 6,965,397 B1 | * | 11/2005 | Honey | H04N 5/222 33/318 |
| 7,100,289 B1 | * | 9/2006 | Strege | G01B 7/315 33/203 |
| 7,225,548 B2 | * | 6/2007 | Sieracki | G02B 23/00 33/267 |
| 7,676,935 B2 | * | 3/2010 | Mitterreiter | G01B 21/22 33/1 PT |
| 7,802,456 B2 | * | 9/2010 | Ikeda | B21D 5/02 72/16.2 |
| 8,074,366 B2 | * | 12/2011 | Jiang | G01C 9/12 33/366.12 |
| 8,074,367 B2 | * | 12/2011 | Jiang | G01C 9/12 33/366.12 |
| 8,875,409 B2 | * | 11/2014 | Kretschmer | G01B 5/008 33/503 |
| 9,289,810 B2 | * | 3/2016 | Nardetto | B21D 5/006 |
| 2002/0170193 A1 | | 11/2002 | Townsend et al. | |
| 2003/0009898 A1 | * | 1/2003 | Slocum | G01L 5/0038 33/706 |
| 2004/0128846 A1 | * | 7/2004 | Horn | B21D 5/002 33/549 |
| 2009/0267827 A1 | * | 10/2009 | Allison | G01C 15/00 342/357.27 |
| 2010/0030482 A1 | | 2/2010 | Li | |
| 2012/0327221 A1 | * | 12/2012 | Christoph | G01B 11/007 348/135 |
| 2013/0201392 A1 | * | 8/2013 | Gutierrez | G03B 3/10 348/374 |
| 2015/0153148 A1 | * | 6/2015 | Angerer | B21D 5/0209 72/379.2 |
| 2015/0268045 A1 | * | 9/2015 | Dusha | G01C 15/06 33/228 |

FOREIGN PATENT DOCUMENTS

| | | |
|---|---|---|
| EP | 2660559 A1 | 11/2013 |
| JP | H1133944 A | 2/1999 |
| WO | 0114826 A1 | 3/2001 |
| WO | 2013188896 A1 | 12/2013 |

* cited by examiner

APPARATUS AND METHOD FOR MEASURING A BENDING ANGLE OF A WORKPIECE

BACKGROUND OF THE INVENTION

The invention relates to machines for bending a workpiece such as a metal strip, section, plate or sheet and in particular concerns an apparatus and a method for measuring a bending angle of a workpiece in a bending machine. The invention also relates to a bending machine including the measuring apparatus.

BRIEF DESCRIPTION OF THE PRIOR ART

The known bending machines include a forming machine tool for bending or folding a workpiece or a portion thereof along a bending line with a predefined bending angle.

There are also known bending machines, also called press brakes, that include a press that vertically moves an upper tool or punch against a lower tool or die in order to bend or fold a workpiece that is positioned on the die. The die is fixed to a machine frame and includes a recess or channel (i.e. V-die or vee-block) that cooperates with the upper punch for bending the workpiece. The punch presses and forces the workpiece against the die in the recess in order to deform and bend the workpiece according to an angle that is a function of the recess shape and the bending force. More precisely, the workpiece is bent along a bending line so that sides or portions thereof form a defined bending angle.

Bending machines, also known as panel benders, are known that include a worktable on which the workpiece can be fixed and fastened by suitable clamping devices while the upper punch bends a free portion of the workpiece.

Some bending machines of this type are equipped with a movable lower punch that moves together with the upper punch for bending the workpiece. The upper punch and the lower punch can also operate independently and separately in order to deform the workpiece along respective bending lines at different operative steps according to respective bending angles.

The known bending machines are usually provided with systems for measuring the bending angle of the workpiece during the bending operation in order to drive the bending tool or punch according to a feedback control. Such measuring systems and related methods detect the bending angle of the workpiece in real time during the bending and allow the desired bending angle to be obtained regardless of the variations of the workpiece features (i.e. thickness, material properties and fiber orientation, etc.) and the wear and tear of the bending tools.

There are known a measuring system and method wherein the workpiece bending angle is calculated as a function of the force exerted on the workpiece by the punch and of the position thereof. A mathematical model containing data concerning the workpiece material properties and the bending operation is nevertheless required for calculating the position and the displacement of the punch in order to obtain the desired bending angle. Satisfactory results can be achieved only if the mathematical model is precise and corresponds to the actual properties of the material and process.

Several vision systems and related methods are known and used for detecting and measuring the bending angle of a workpiece.

EP 1202032 discloses a bending machine and method for measuring on two sides of a die a number of distances on a plane which intersects the sheet to be bent and the die. The distances include a number of distances between a measuring instrument and various points on the sheet and a number of further distances between the measuring instruments and various points on the die, in order to determine for each side of the die a respective profile of the measured distances and from the profiles of these distances, the respective angles between sheet and die. The bending angle of the sheet is determined as a function of the angles determined between sheet and die.

EP 1204845 discloses a process and a device for detecting a bending angle in a workpiece wherein a light beam is provided that is directed towards a side of the workpiece, the angular position of which must be measured. The light beam is constructed as a light plane or light cone, as a light line or path or, in particular, as a symmetric geometric shape which is produced either on the workpiece or on one side thereof. The change in the position of the contact point during the bending operation is detected in an opto-electronic manner, e.g. by a video camera, in particular by an array video camera, and the angular position of the side of the workpiece is calculated by the changes in the position of the contact point seen by the video camera.

EP 2660559 describes an apparatus and a method for measuring a bending angle of a workpiece wherein there are provided a processing unit and at least one sensor that includes a light source which projects a light pattern on at least one side of the workpiece, and a recording device adapted to record the image of the projection of the light pattern on a side of the sheet. The processing unit is adapted to control the recording device for recording the image in at least one time instant during the operation of bending the sheet. The control unit is capable of transforming the recorded image into a point cloud and includes a neural network adapted to a bending angle value with the point cloud.

The vision measuring systems and methods disclosed in the above described patents are precise and quite reliable. However, they have a number of drawbacks.

Such vision measuring systems require expensive devices such as light emitters, video cameras or video recorders and powerful computers or processors able to calculate the bending angle during the deforming process on the basis of the recorded images.

Furthermore, such systems and methods require sophisticated control software and long and laborious tuning procedures.

The devices, in particular the light emitters and the video cameras or video recorders, are quite bulky and have to be moved and positioned close to the workpiece in order to detect the bending angle. In several bending machines (such as for instance the panel bender) the positioning of such a device is difficult both manually and automatically because of the dimensions and structure of the mechanisms and operative devices of the machine.

Vision systems also require a minimum dimension of the workpiece portion to be bent in order to receive and reflect the light beam for the video camera or video record.

Moreover, the operation of such vision measuring systems is highly influenced by the environment of the factory plant or workshop wherein the bending machine is positioned and operates. In fact, dust, fifth, grime, oil, daylight, back reflection of the workpiece surface (due to excessive and/or uneven lighting and/or direct exposure to sun rays), etc., which can usually be found in a factory environment, may affect and sometimes preclude the correct operation of the vision systems.

SUMMARY OF THE INVENTION

An object of the present invention is to improve the known apparatus and methods for measuring a bending angle of a workpiece in a bending machine.

Another object is to achieve a measuring apparatus and method that are not influenced or affected by the environment of the factory plant or workshop where the bending machine is positioned and to provide precise and reliable measurements even with dust, fifth, grime, oil, etc.

A further object is to achieve a measuring apparatus and method that can be used for measuring the bending angle of a small workpiece of small portions thereof.

Still another object is to achieve a measuring apparatus which is very compact and low-cost and which can very easily and effectively be implemented and used in all kinds of bending machines.

Another object is to achieve a measuring apparatus and a method that do not necessitate sophisticated control software and long and laborious tuning procedures.

The apparatus and the methods of the invention allow measuring a bending angle of a workpiece in a bending machine in a very efficient and economical way.

The apparatus according to the first embodiment includes a motion sensor unit which is provided with a micro gyroscope sensor and which can be easily and rapidly associated with a portion of the workpiece to be bent. During the workpiece bending, data concerning angular velocities and rotation angles of the portion are measured by a gyroscope sensor and sent to a processing unit that calculates precisely, accurately and in real time the bending angle of the workpiece as a function on the measured rotation angles. The processing unit transmits the calculated value of the bending angle to a control unit of the bending machine so that an operation of bending tools thereof can be controlled in order to obtain a required bending angle. Thus the apparatus of the invention allows feedback or closed-loop control of the bending operation.

Precision and accuracy of the bending angle values calculated as a function of the measured rotation angles (sensed by the gyroscope sensor) are comparable to, or even better than, precision and accuracy of measurements of a bending angle obtained using the known systems, in particular the optical measuring systems.

The motion sensor unit that includes a micro MEMS gyroscope sensor is an integrated electronic device which is less expensive than the known optical measuring systems.

The apparatus of the invention is not influenced or affected by the environment of the factory plant or workshop wherein the bending machine is positioned and provides precise and reliable measurements, even with dust, fifth, grime, oil, daylight, back reflection of the workpiece surface (due to excessive and/or uneven lighting and/or direct exposure to sun rays), etc.

Owing to the very small dimension of the miniature or micro MEMS gyroscope sensor (and thus of the motion sensor unit) it is possible to also measure the bending angle of a small workpiece or small portions thereof. The apparatus of the invention can be very easily and effectively implemented and used in almost all types of bending machines.

The apparatus provides the processing unit of the bending machine with data concerning the rotation angles of the workpiece portions, such data being easily and quickly used for calculating the bending angle of the workpiece. Thus no sophisticated control software and/or long and laborious tuning procedures are required for measuring the bending angle with the apparatus and method of the invention.

The apparatus according to the second aspect includes a motion sensor unit which is provided with an accelerometer sensor and which can be easily and rapidly associated to a portion of the workpiece to be bent. In the bending operation, accelerations acting on the portion along at least two orthogonal axes are measured by the accelerometer sensor and sent to a processing unit that precisely and accurately calculates a bending angle of the workpiece as a function of the measured accelerations. Preferably the accelerometer sensor measures the accelerations when the workpiece is substantially motionless so that the accelerations are approximately static accelerations including components of the gravity acceleration caused by the gravitational force acting on the accelerometer sensor. Therefore, the processing unit can calculate from the accelerations a rotation angle of the portion and then the bending angle of the workpiece.

The value of bending angle is sent to a control unit of the bending machine. If the measured bending angle is smaller than a required bending angle additional bending can be carried out (namely an additional movement of bending tools) in order to further bend the workpiece and obtain the required bending angle. Hence the apparatus of the invention allows a closed-loop control of the bending operation.

The motion sensor unit, which includes a micro MEMS accelerometer sensor, is an integrated electronic device that is low-priced with respect to the known optical measuring systems and that is not influenced or affected by the environment of the factory plant or workshop wherein the bending machine is positioned and thus is capable of providing precise and reliable measures even with dust, fifth, grime, oil, daylight, back reflection of the workpiece surface (due to excessive and/or uneven lighting and/or direct exposure to sun rays), etc.

Owing to the very small dimension of the miniature or micro MEMS accelerometer sensor (and thus of the motion sensor unit) it is possible to also measure the bending angle of a small workpiece of small portions thereof. The apparatus of the invention can be very easily and effectively implemented and used in almost all type of bending machine.

The apparatus may also include a gyroscope sensor for measuring angular velocities and rotation angles of the portion of the workpiece. The rotation angles measured by the gyroscope sensor can be used by the processing unit for calculating a value of the bending angle of the workpiece to be compared with value of the bending angle calculated from the accelerations in order to obtain a more precise and accurate value of the bending angle. Furthermore, the gyroscope sensor can also be used for controlling the operation of an accelerometer sensor. In fact, the gyroscope sensor can be used to check when the workpiece is substantially motionless (i.e. when the angular velocities are close to zero) so that the accelerometer sensor can be activated for measuring the accelerations (approximately static accelerations).

BRIEF DESCRIPTION OF THE FIGURES

These and other characteristics of the invention will be clear from the following description of preferential embodiments, given as a non-restrictive examples, with reference to the accompanying drawings wherein.

DETAILED DESCRIPTION

Figure 2:
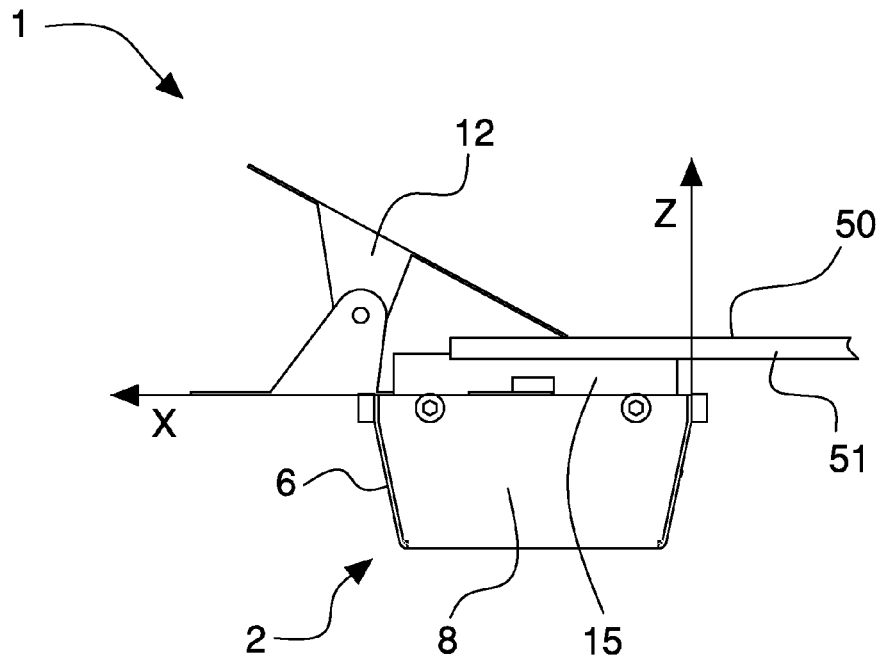
FIG. 2 is a side view of the apparatus of FIG. 1.

The apparatus 1 according to the invention for measuring a bending angle α of a workpiece 50 in a bending machine 100 includes at least one motion sensor unit 2 provided with a gyroscope sensor 3, a processing unit 10 connected to the gyroscope sensor 3, and coupling device 12, 11 for connecting the motion sensor unit 2 with the workpiece 50. The workpiece 50 includes, for instance, a metal strip, section, plate or sheet and the bending angle α is the angle formed by two portions 51, 52 of the workpiece 50 after the bending or folding process.

The gyroscope sensor 3 includes a micro or miniature gyroscope sensor and the coupling device 12, 11 is arranged for connecting the motion sensor unit 2 to one of the two portions 51, 52 of the workpiece 50 that is intended to be bent.

Figure 5:
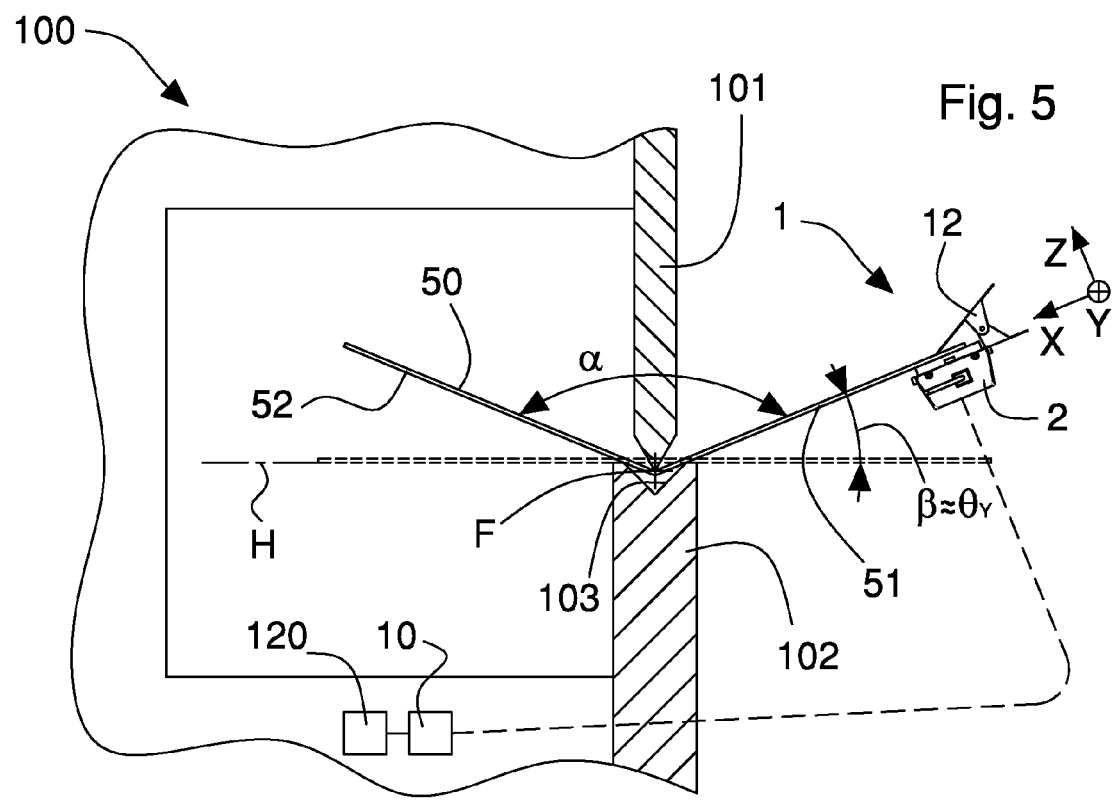
FIG. 5 is schematic side view of the apparatus of the invention fixed to a workpiece and associated with a bending machine.
Figure 6:
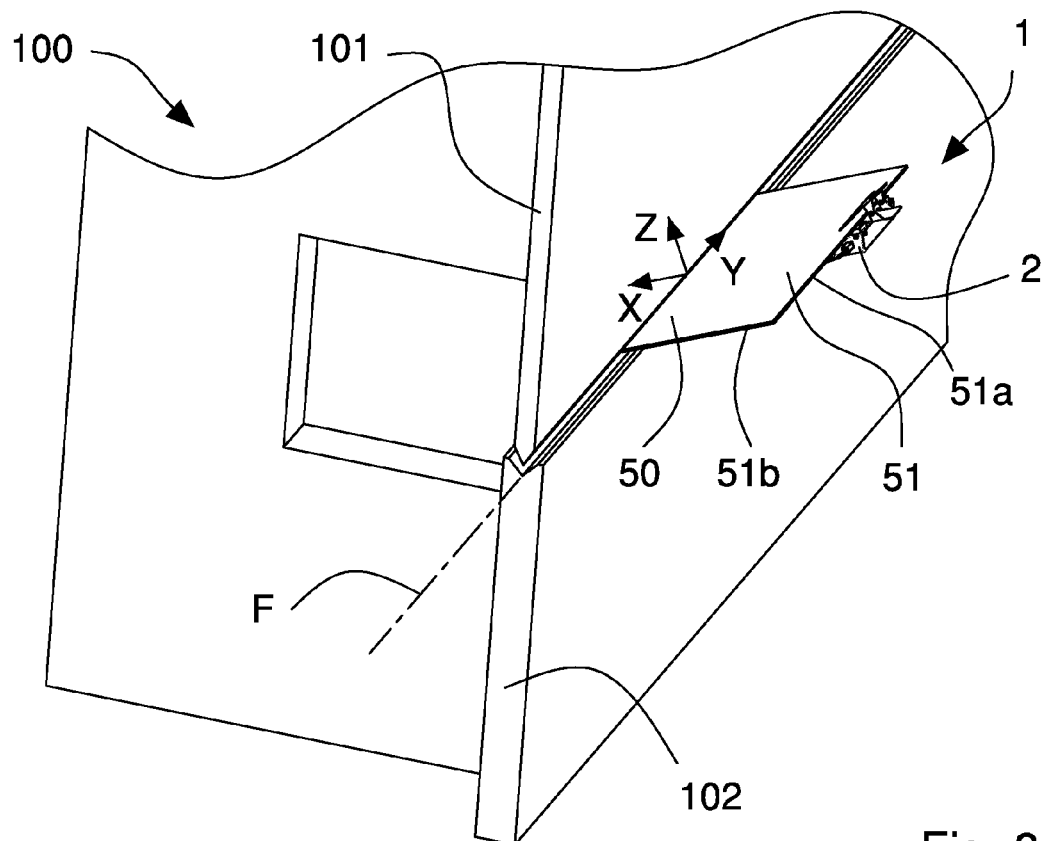
FIG. 6 is a perspective view of the apparatus and the bending machine of FIG. 5.

With reference to the example shown in FIGS. 5 and 6, the bending machine 100 is a press brake provided with bending tools 101, 102 including a mobile upper punch 101 and a fixed lower die 102, in particular a V-die provided with a recess 103. The punch 101 moves vertically against the die 102 for bending or folding the workpiece 50, such as sheet metal, so that the two opposite portions 51, 52 thereof (that are bent closer to each other) form a bending angle α having a predefined and desired value.

The motion sensor unit 2 includes a casing 6 that supports and encloses the gyroscope sensor 3. The casing 6 includes a support element 7 to which the gyroscope sensor 3 is fixed and a cover 8 that is removably mounted on the support element 7 for enclosing the gyroscope sensor 3. The gyroscope sensor 3 is fixed to the support element 7 via a base plate 9.

An interface element 15 is fixed to an external wall of the support element 7 and is arranged for engaging a surface of one of the portions 51, 52 of the workpiece 50 (the portion 51 in the figures). In the illustrated embodiment, the interface element 15 includes a longitudinal relief or abutment 13 suitable for engaging and mating with a longitudinal edge 51a of the portion 51.

In an alternate embodiment of the apparatus 1 that is not illustrated, the gyroscope sensor 3 is directly fixed to the support element 7.

In a further embodiment of the apparatus 1 that is not illustrated, the interface element 15 and the support element 7 are integral.

The gyroscope sensor 3, which includes a miniature or micro gyroscope sensor, can be easily fixed or connected with the workpiece 50. In a preferred embodiment, the gyroscope sensor 3 is a MEMS gyroscope sensor, namely a micro gyroscope sensor developed and built according to microelectromechanical systems technology (MEMS).

The gyroscope sensor 3 is a miniature vibration gyroscope, also called a vibrating structure gyroscope or Coriolis vibratory gyroscope, which uses solid-state resonators or transducers (MEMS elements) of different shapes for detecting the Coriolis force applied to a vibrating element of the sensor during movement and then calculates on the basis of the force the angular velocity or rotation rate or speed. By mathematical integration of the rotation rate measurements the gyroscope sensor calculates a related rotation angle.

Thus, during the bending operation, the gyroscope sensor 3 may sense and measure at least one angular velocity, or rotation rate or speed, $\omega_X$, $\omega_Y$, $\omega_Z$ of the portion 51 of the workpiece 50 and a related rotation angle $\theta_X$, $\theta_Y$, $\theta_Z$ so that the processing unit 10, which receives from the gyroscope sensor 3 data regarding the angular velocity $\omega_X$, $\omega_Y$, $\omega_Z$ and the rotation angle $\theta_X$, $\theta_Y$, $\theta_Z$, may calculate the bending angle α as a function of the rotation angle $\theta_X$, $\theta_Y$, $\theta_Z$, as better explained in the description below. More precisely, the gyroscope sensor 3 senses an angular velocity or rate along a single axis and then calculates the corresponding rotation angle by mathematical integration.

The processing unit 10 can be connected with the motion sensor unit 2 or to a control unit 120 of the bending machine 100, in particular the processing unit 10 can be embedded in, or part of, the control unit 120.

Figure 1:
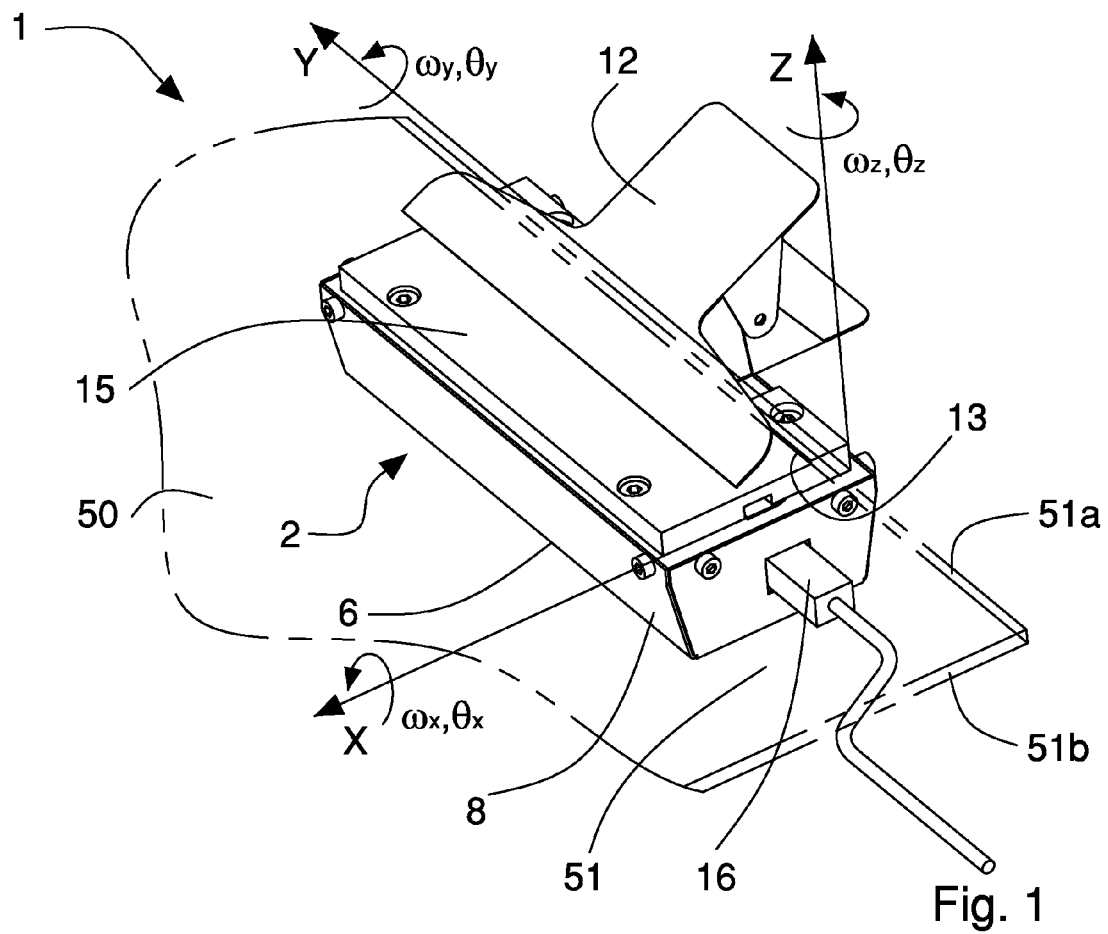
FIG. 1 is a bottom perspective view of the apparatus of the invention for measuring a bending angle and associated to a workpiece that is partially shown in a dotted line.
Figure 3:
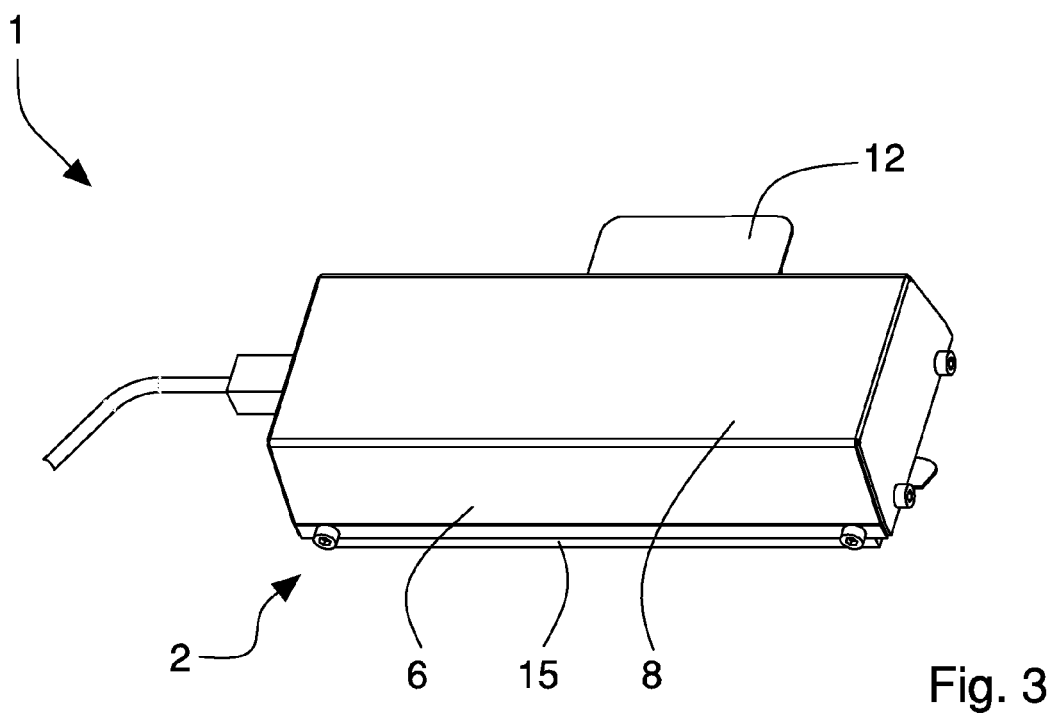
FIG. 3 is a top perspective view of the apparatus of FIG. 1.
Figure 4:
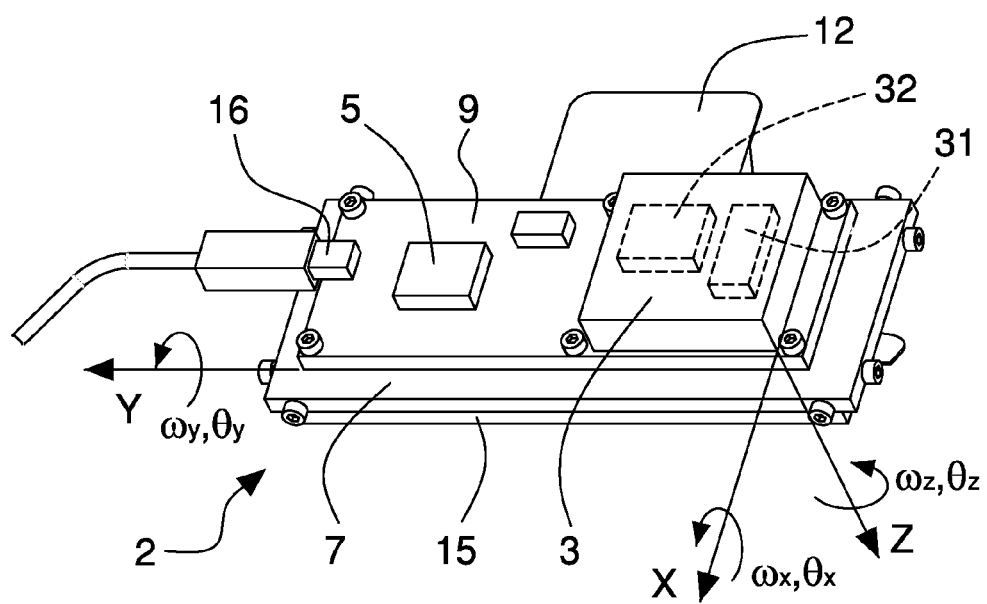
FIG. 4 is a top perspective view of the apparatus of FIG. 1 shown without a cover.

In the illustrated embodiment, the gyroscope sensor 3 is preferably a tri-axial gyroscope sensor arranged for measuring three angular velocities $\omega_X$, $\omega_Y$, $\omega_Z$ and for calculating three related rotation angles $\theta_X$, $\theta_Y$, $\theta_Z$ according to three orthogonal axes X, Y, Z. As shown in FIG. 1, the motion sensor unit 2 is fixed to a lower surface of the portion 51 of the workpiece 50 so that the X axis is parallel to a transverse edge 51b of the portion 51, the Y axis is parallel to the longitudinal edge 51a of the portion 51 and the Z axis is orthogonal to the lower surface of portion 51.

Known micro or MEMS gyroscope sensors for motion measurement (angular rate) along a single axis (single-axis gyroscope) or along three orthogonal axes (3-axis gyroscope) are, for instance, the MEMS gyroscopes of STMicroelectonics series LG3D20, L3GDH20, LY330ALH.

The gyroscope sensor 3 includes a register 31 and processing module 32 for registering data concerning the angular velocities $\omega_X$, $\omega_Y$, $\omega_Z$, and for calculating the related rotation angles $\theta_X$, $\theta_Y$, $\theta_Z$ and/or a rotation matrix.

The motion sensor unit 2 further includes a transmitting unit 5 for transmitting to the processing unit 10 or to the control unit 120 of the bending machine 100 data relating to the angular velocities $\omega_X$, $\omega_Y$, $\omega_Z$ and rotation angles $\theta_X$, $\theta_Y$, $\theta_Z$ or relating to the calculated bending angle α.

In particular, if the processing unit 10 is mounted on the bending machine 100 and connected to (or integrated or embedded in) the control unit 120 of the bending machine 100 (as in the illustrated embodiment of FIGS. 5 and 6), the transmitting unit 5 is connected to the gyroscope sensor 3 (connected to the register and processing module thereof) and transmits to the processing unit 10 data relating to the angular velocities $\omega_X$, $\omega_Y$, $\omega_Z$ and the rotation angles $\theta_X$, $\theta_Y$, $\theta_Z$ in order to calculate the bending angle $\alpha$.

If the processing unit 10 is included in the motion sensor unit 2 the transmitting unit 5 transmits to the control unit 120 of the bending machine 100 the data concerning the bending angle $\alpha$ calculated by the processing unit 10 as a function of the angular velocities $\omega_X$, $\omega_Y$, $\omega_Z$ and the rotation angles $\theta_X$, $\theta_Y$, $\theta_Z$ sensed by the gyroscope sensor 3.

The control unit 120 controls the operation of the bending machine 100 and, in particular, the operation of bending tools 101, 102 working on the workpiece 50. During the bending operation, the control unit 120 receives the data relating to the calculated bending angle $\alpha$ in order to control an operation (motion or strike) of the bending tools 101, 102.

The transmitting unit 5 is positioned inside the casing 6, fixed to the support element 7.

The transmitting unit 5 includes a network interface controller, for instance a wired network interface such as an Ethernet controller or a wireless network controller such as a Wi-Fi controller or the like. In the illustrated embodiment the transmitting unit 5 is coupled to a modular connector or plug 16 for an Ethernet wire connection.

The coupling device 12, 11 includes a fastening device 12 arranged for removably fastening the casing 6 and thus the motion sensor unit 2 to the portion 51. In the embodiment shown in FIGS. 1 to 6, fastening device 12 includes a clamp or clip that is fixed to the casing 6 and arranged for elastically and removably clamping the portion 51 of the workpiece 50.

Alternatively, the fastening device may include repositionable glue or a magnetic element, such as a permanent magnet or an electromagnet suitable to attach on a surface of a workpiece made of ferromagnetic material, such as iron or steel.

The apparatus 1 for measuring a bending angle $\alpha$ of a workpiece 50 as described heretofore functions as follows.

With reference to the bending machine 100 of FIGS. 5 and 6, before starting the bending, the motion sensor unit 2 of the apparatus 1 is manually fastened to one of the portions 51, 52 of the workpiece 50 (for instance the portion 51) using the coupling device 12. In this initial step the two portions 51, 52 for instance are coplanar and form an angle of 180° (as shown in the dotted line in FIG. 5).

During the following bending step, the workpiece 50 is bent along a bending line F and the two portion 51, 52 are progressively folded closer to each other until they form a predefined bending angle $\alpha$ that depends on the shape and dimension of the punch 101 and die 102 and on the position of the punch 101.

During the bending of workpiece 50, the portion 51 that carries the motion sensor unit 2 moves and substantially rotates around the folding line F. The gyroscope sensor 3 measures angular velocities $\omega_X$, $\omega_Y$, $\omega_Z$ around the three axes X, Y, Z of the portion 51 and calculates the related rotation angle $\theta_X$, $\theta_Y$, $\theta_Z$.

More precisely, the register and processing module of gyroscope sensor 3 calculates each rotation angle around a respective axis by integration of the respective angular velocity, or rotation rate, according, for instance, to the following formula (disclosed for Y axis):

$$\theta_Y = \frac{1}{f_s} \sum_{k=0}^{N} \omega_Y(t_K)$$

wherein:
$\theta_Y$ is the rotation angle around the Y axis;
$\omega_Y(t_k)$ is the angular velocity, or rotation rate, around the Y axis at time $t_K$;
$f_s$ is the sample rate;
$t_k$ is the sample time; and
N is the number of samples progressively acquired during the rotation of portion 51.

The register and processing module of gyroscope sensor 3 also calculates the rotation matrix.

It should be noted that the gyroscope sensor 3 measures the rotation angle of the portion 51 regardless of the initial position thereof. In other words, gyroscope sensor 3 does not require data concerning the initial position.

The processing unit 10 of the apparatus 1 calculates the bending angle $\alpha$ as a function of the calculated rotation angles $\theta_X$, $\theta_Y$, $\theta_Z$ (or using the rotation matrix). The bending angle $\alpha$ can be also calculated as a function of setup data such as shape and dimension of punch 101, die 102 and workpiece 50 and the position thereof on the die 102. The setup data can be entered in the processing unit 10 (for instance via the control unit 120 of the bending machine 100) before the bending operation starts.

In the example of FIGS. 5 and 6, the bending angle $\alpha$ between the portion 51 and the further portion 52 can easily be calculated from the rotation angle $\beta$ between the portion 51 and a horizontal reference plane H and assuming that the further portion 52 forms the same rotation angle $\beta$ with the reference plane H, in other words assuming that the workpiece 50 is bent symmetrically with respect to a vertical plane passing through the bending line F.

In the illustrated embodiment, the rotation angle $\beta$ between the portion 51 and the reference plane H substantially corresponds to the rotation angle $\theta_Y$ around the Y axis measured by the gyroscope sensor 3 since the Y axis is substantially parallel to the folding line F. Thus, the bending angle $\alpha$ can be calculated as a function of the the rotation angle $\beta \approx \theta_Y$ of both portions 51, 52:

$\alpha = 180° - 2\beta$

Should the motion sensor unit 2 being mounted on the portion 51 with the Y axis out of alignment with the folding line F, the rotation angle $\beta$ between the portion 51 and a reference plane H can be calculated from the calculated rotation matrix.

Figure 7:
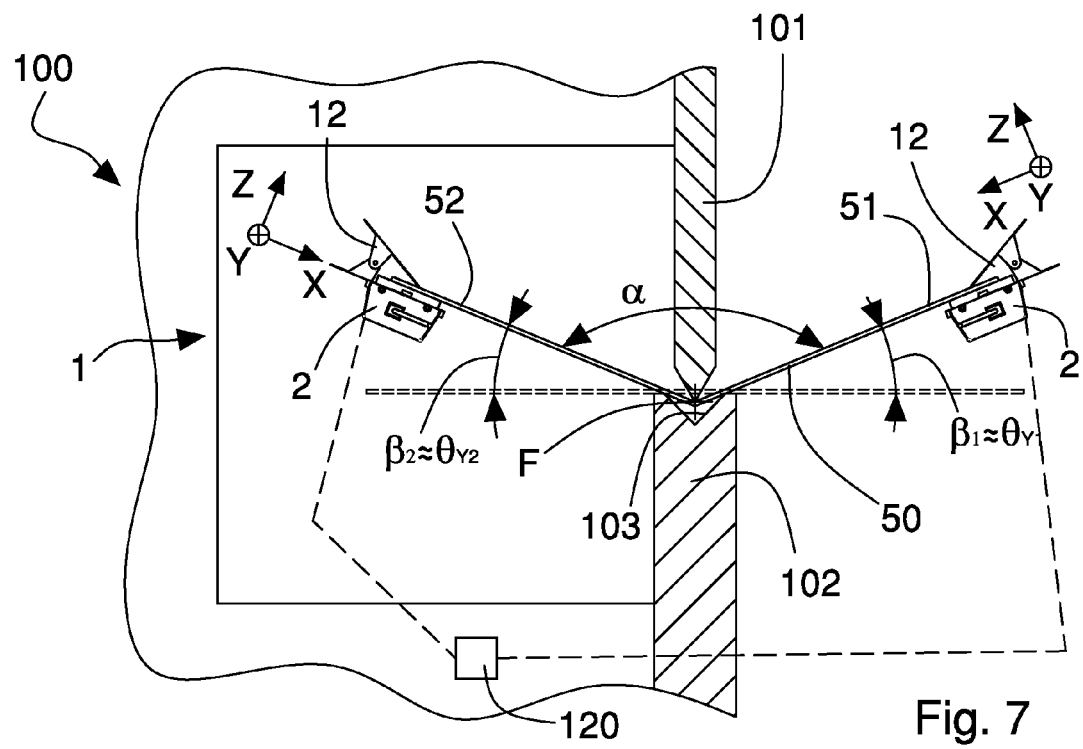
FIG. 7 is schematic side view of a variant of the apparatus of the invention fixed to a workpiece and associated with the bending machine of FIG. 5.

As shown in the variant of FIG. 7, the apparatus 1 of the invention may include two motion sensor units 2 provided with respective gyroscope sensors 3 and respective coupling devices 12 for mounting the motion sensor units 2, respectively, to the portion 51 and the further portion 52 of the workpiece 50.

During bending of the workpiece 50 the two gyroscope sensors 3 measure respective angular velocities $\omega_{Y1}$, to $\omega_{Y2}$ around the Y axis and calculate the related rotation angles $\theta_{Y1}$, $\theta_{Y2}$ of the portion 51 and further portion 52. The bending angle $\alpha$ can be calculated as function of the the rotation angles $\beta_1 \approx \theta_{Y1}$, $\beta_2 \approx \theta_{Y2}$ of the portion 51 and further portion 52:

$\alpha = 180° - (\beta_1 + \beta_2)$

It should be noted that the bending angle $\alpha$ can be calculated in real time during bending so that the control unit 120 (that receives data concerning the bending angle α) can control the motion of the bending tools 101, 102, namely a vertical movement of the punch 101 in order to obtain a desired bending angle α of the workpiece 50. In other words, the apparatus 1 of the invention allows a feedback or closed-loop control of the bending operation, in particular of the operation of the bending tools 101, 102.

When the bending operation ends, the motion sensor unit 2 can be easily and quickly dismounted from the workpiece 50 by an operator and ready for mounting on a subsequent workpiece 50.

The method according to the invention for measuring a bending angle α between two portions 51, 52 of a workpiece 50 includes measuring via a motion sensor unit 2 provided with a gyroscope sensor 3 and connected with a portion 51, 52 to be bent at least one angular velocity $\omega_X$, $\omega_Y$, $\omega_Z$ and a related rotation angle $\theta_X$, $\theta_Y$, $\theta_Z$ of the portion 51, 52 and calculating the bending angle α as a function of the rotation angle $\theta_X$, $\theta_Y$, $\theta_Z$.

Preferably, the method uses the gyroscope sensor 3 to measure angular velocities $\omega_X$, $\omega_Y$, $\omega_Z$ and related rotation angles $\theta_X$, $\theta_Y$, $\theta_Z$ of the portions 51, 52 according to three orthogonal axes X, Y, Z and calculating the bending angle α as a function of the measured rotation angles $\theta_X$, $\theta_Y$, $\theta_Z$. More precisely, the bending angle α can be calculated on the basis of a rotation matrix that is calculated along with the rotation angles $\theta_X$, $\theta_Y$, $\theta_Z$ by the gyroscope sensor 3.

Furthermore the method according to the invention includes measuring the bending angle α using two motion sensor units 2 that include respective gyroscope sensors 3 and are connected with a portion 51 and a further portion 52, respectively, of the workpiece 50. During a bending operation of workpiece 50 the gyroscope sensors 3 measure respective angular velocities $\omega_{Y1}$, $\omega_{Y2}$ and a related rotation angles $\theta_{Y1}$, $\theta_{Y2}$ of the respective portions 51, 52 so as to calculate the bending angle α as a function of the measured rotation angles $\theta_{Y1}$, $\theta_{Y2}$ of the portions 51, 52.

The apparatus and the method of the invention afford measuring a bending angle α of a workpiece 50 in a bending machine 100 in a very efficient and economical manner.

The motion sensor unit 2 of the apparatus 1 of the invention can be easily and quickly connected with the portion 51 of the workpiece 50 to be bent by an operator.

During the bending operation, data concerning rotation angles $\theta_X$, $\theta_Y$, $\theta_Z$ of the portion 51 are sent by the gyroscope sensor 3 of the motion sensor unit 2 to the processing unit 10 that calculates the bending angle α in real time, precisely and accurately, as a function of the measured rotation angles $\theta_X$, $\theta_Y$, $\theta_Z$. Therefore the control unit 120 of the bending machine 100 that receives data concerning the bending angle α can drive the bending tools 101, 102 according to a feedback or closed-loop control in order to obtain the required bending angle.

Several tests have been conducted which show that precision and accuracy of the bending angle α that is calculated as a function of the rotation angles $\theta_X$, $\theta_Y$, $\theta_Z$ (sensed and measured by the gyroscope sensor 3) are comparable to, or even better than, the precision and accuracy of the measurements of the bending angle α obtained using the known systems, in particular the optical measuring systems.

The motion sensor unit 2 that includes the MEMS gyroscope sensor 3 is an integrated electronic device, very low-priced with respect to the known optical measuring systems.

It should be noted that the apparatus 1 of the invention is not influenced or affected by the environment of the factory plant or workshop wherein the bending machine is positioned and provides precise and reliable measurements even with dust, fifth, grime, oil, daylight, back reflection of the workpiece surface (due to excessive and/or uneven lighting and/or direct exposure to sun rays), etc. The gyroscope sensor 3 can also be shielded against magnetic and/or electromagnetic interferences.

Owing to the very small dimension of the miniature or micro MEMS gyroscope sensor 3 and thus of the motion sensor unit 2, it is possible to also measure the bending angle of a small workpiece 50 of small portions thereof.

The apparatus 1 can be easily and effectively implemented and used in almost all kinds of bending machines.

The apparatus 1 provides the control unit 120 of the bending machine with data concerning the bending angle α of the workpiece 50. Thus no sophisticated control software and/or long and laborious tuning procedures are required for measuring the bending angle with the apparatus and method of the invention.

Figure 8:
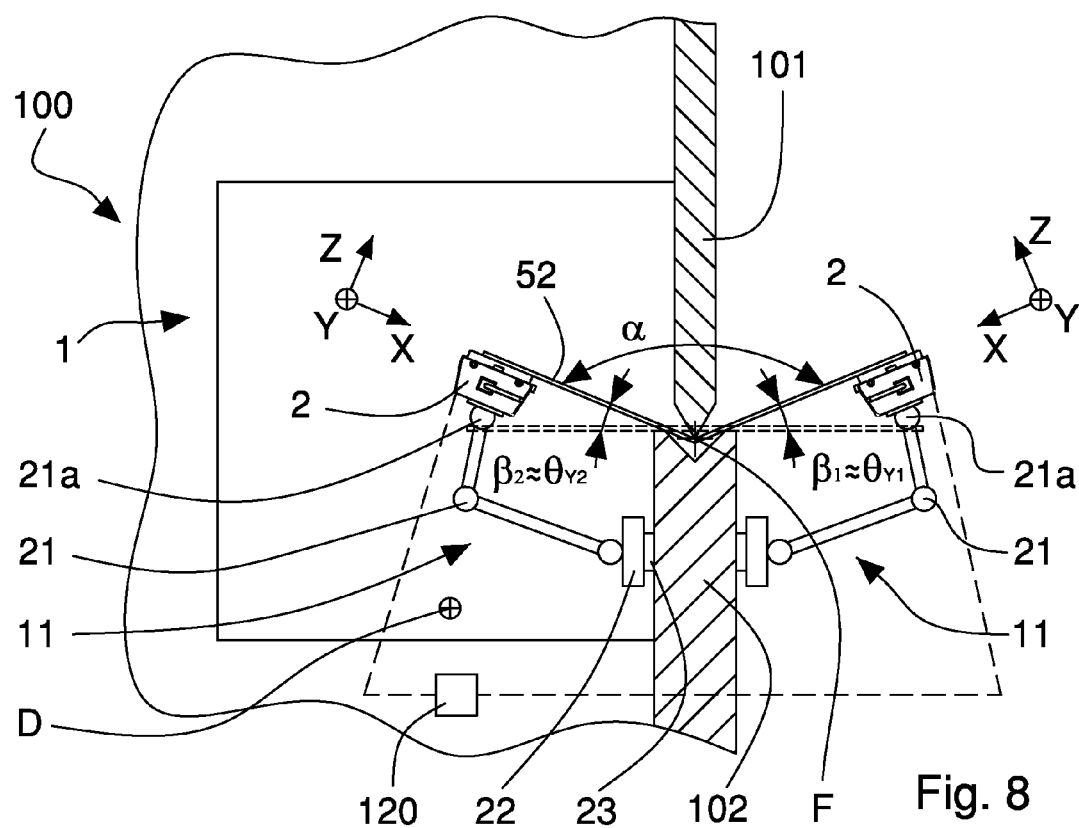
FIG. 8 is schematic side view of another variant of the apparatus of the invention fixed to a workpiece and associated with the bending machine of FIG. 5.

With reference to FIG. 8, an alternate embodiment of the apparatus 1 is shown that is used with the bending machine 100 (press brake) of FIG. 7 and includes two motion sensor units 2 provided with respective coupling devices which include supporting devices 11 mounted on the bending machine 100 and arranged for supporting and maintaining the motion sensor units 2 in contact and against the portion 51 and further portion 52 of the workpiece 50. Hence the supporting devices 11 removably connect the motion sensor units 2 with the workpiece 50.

In the illustrated embodiment, the supporting device 11 includes, for example, two articulated arms 21 having respective free ends 21a arranged for supporting the motion sensor units 2 for rotation around three orthogonal axes.

Each articulated arm 21 is fixed to a respective shuttle or carriage 22 that is movable along a longitudinal displacement direction D through the bending machine 100. In particular, each carriage 22 is movable along a respective guide rail 23 fixed on a side wall of the die 102 of the bending machine 100 and parallel to the longitudinal displacement direction D.

The articulated arms 21 are controlled by the control unit 120 of the bending machine 100 so that the motion sensor units 2 of the apparatus 1 can be automatically positioned along the longitudinal displacement direction D close to the workpiece 50 and then moved against the respective portions 51, 52 in order to measure the rotation angles $\beta_1$, $\beta_2$ between the portions 51, 52 and the reference plane H (to which the workpiece 50 was coplanar before the bending operation). The rotation angles $\beta_1$, $\beta_2$ substantially correspond to the measured rotation angle $\theta_{Y1}$, $\theta_{Y2}$ around the Y axes of the gyroscope sensors 3 since the Y axes are substantially parallel to the folding line F.

The bending angle α can be calculated as a function of the rotation angles $\beta_1 \approx \theta_{Y1}$, $\beta_2 \approx \theta_{Y2}$:

$$\alpha = 180° - (\beta_1 + \beta_2)$$

It should be noted that the position of the motion sensor units 2 which abut on the portions 51, 52 does not affect the measurement since the rotation angles β can be calculated from the rotation matrix computed by the gyroscope sensors 3.

Owing to this embodiment of the apparatus 1 of the invention it is possible to automatically position and connect the motion sensor units 2 with the workpiece 50 without an operator's manual intervention. Furthermore, the mobile supporting device 11 enables the motion sensor unit 2 to be mounted on portions 51, 52 of the workpiece 50 that cannot be manually reached by an operator, for example because such portions 51, 52 are inside the bending machine 100. In the illustrated example, the further portion 52 of workpiece 50 is positioned in an internal part of the bending machine 100, behind the bending tools 101, 102 on the opposite side with respect to an operator position.

Figure 9:
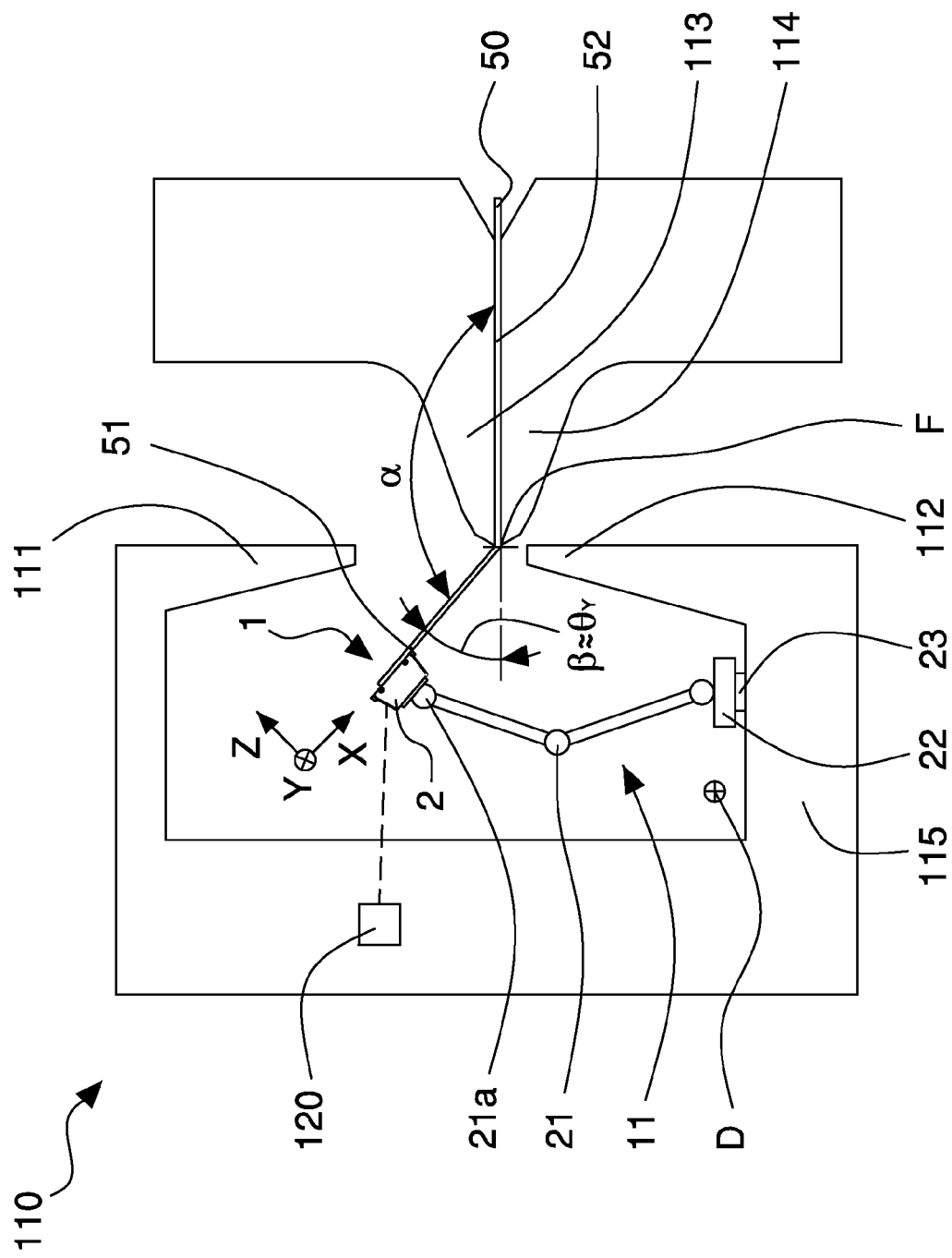
FIG. 9 is schematic side view of a further variant of the apparatus of the invention fixed to a workpiece and associated with another bending machine.

FIG. 9 shows a further embodiment of the apparatus 1 which is mounted on a bending machine 110, also called a panel bender, provided with bending tools that includes an upper punch 111 and an opposed lower punch 112 that are movable so as to contact a workpiece 50 from above and below with respective linear bending tools. The workpiece 50 is fixed and tightened by clamping devices 113, 114 of the bending machine 110. The clamping devices include an upper clamp 113 that moves vertically against a fixed lower clamp 114 that forms a support surface for the workpiece 50.

The coupling device of the apparatus 1 includes a supporting device 11 that is mounted on a base frame 115 of the bending machine 110 and is arranged for supporting and maintaining the motion sensor unit 2 in contact and against the portion 51 of the workpiece 50 to be bent during the bending operation. Hence the supporting device 11 removably couples the motion sensor unit 2 with the workpiece 50.

In the illustrated embodiment, the supporting device 11 includes, for example, an articulated arm 21 having a free end 21a arranged for supporting the motion sensor unit 2 rotatably around three orthogonal axes. The articulated arm 21 is fixed to a shuttle or carriage 22 that is movable along a longitudinal displacement direction D through the bending machine 2. The carriage 22 is movable along a guide rail 23 fixed to the base frame 115 and parallel to the longitudinal displacement direction D.

The articulated arm 21 is controlled by the control unit 120 so that the motion sensor unit 2 of the apparatus 1 can be automatically positioned along the longitudinal displacement direction D close to the workpiece 50 and then moved against the portion 51 in order to measure a rotation angle β between the portion 51 and the further portion 52. In the illustrated embodiment, the rotation angle β between the portions 51, 52 of workpiece 50 substantially corresponds to the calculated rotation angle $\theta_Y$ around the Y axis of the gyroscope sensor 3 since the Y axis is substantially parallel to the folding line F. The rotation angle β is the supplementary angle of the bending angle α.

Also, this further embodiment of the apparatus 1 of the invention allows the motion sensor unit 2 to be automatically positioned and mounted on the workpiece 50 without an operator's manual intervention. Furthermore, thanks to the mobile supporting means 11 it is possible to connect the motion sensor unit 2 with the portion 51 even if the latter cannot be manually reached by an operator, for example because the portion 51 is positioned in an internal part of the bending machine 110 behind the bending tools 111, 112 on the opposite side with respect to an operator position.

Figure 10:
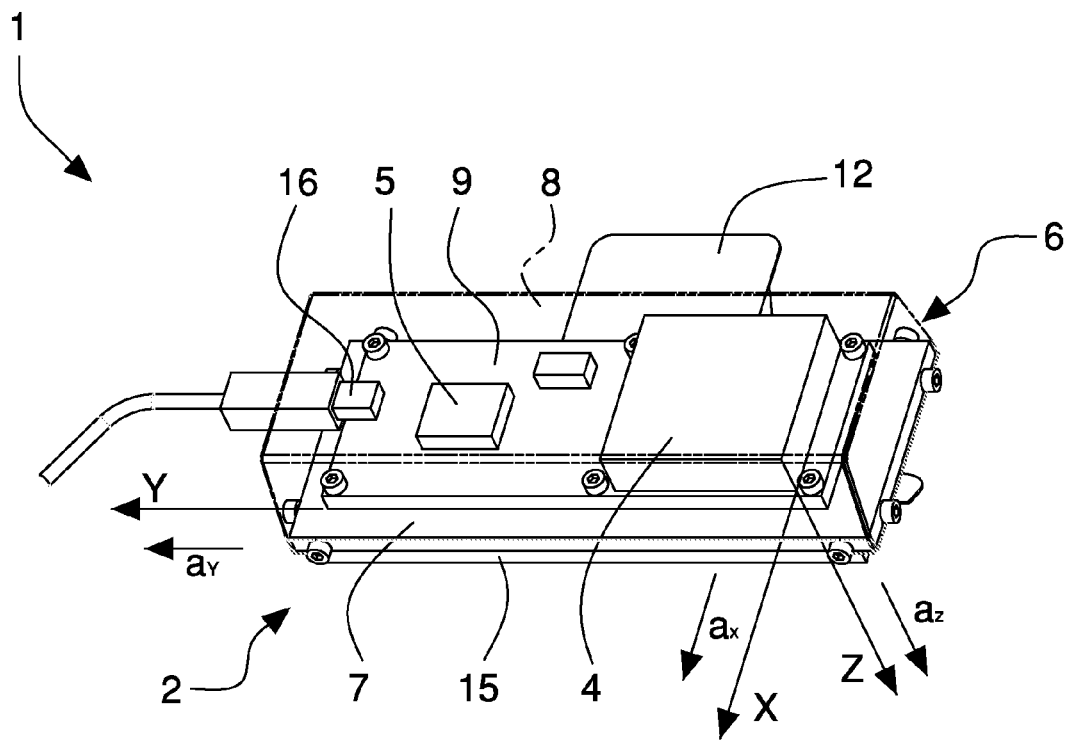
FIG. 10 is a top perspective view of another embodiment of the apparatus of the invention with a cover shown in a dotted line.
Figure 11:
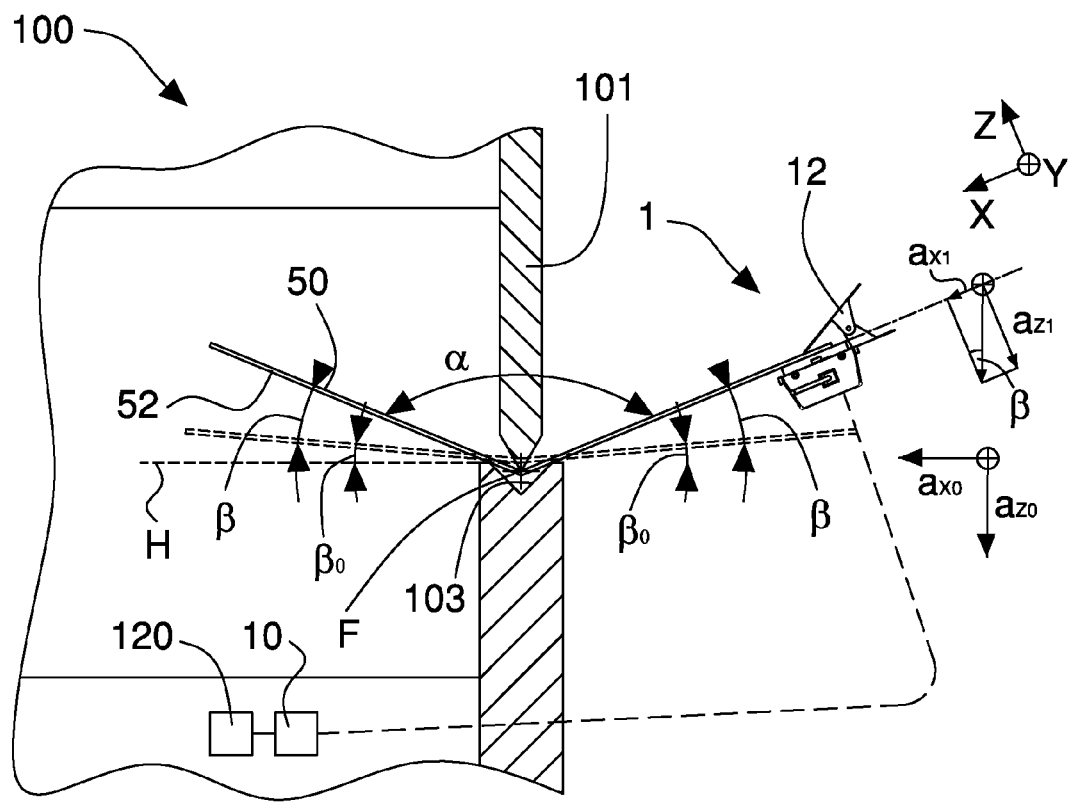
FIG. 11 is schematic side view of the apparatus of FIG. 10 associated with a workpiece and with a bending machine.

With reference to FIGS. 10 and 11, another embodiment of the apparatus 1 of the invention is provided that differs from the above described embodiment in that the motion sensor unit 2 includes, instead of a gyroscope sensor, an accelerometer sensor 4 that is connected to the process unit 10 and is an inertial sensor suitable for measuring (linear) accelerations $a_X$, $a_Z$ according to at least two orthogonal axes X, Z. Preferably, the accelerometer sensor 4 is a tri-axial accelerometer sensor and the inertial measurements include three accelerations $a_X$, $a_Y$, $a_Z$ measured by the accelerometer sensor 4 along three orthogonal axes X, Y, Z.

The acceleration sensor 4 is a miniature or micro sensor and includes a MEMS linear acceleration sensor. The acceleration sensor 4 is fixed to the support element 7 of the casing 6.

Known micro or MEMS accelerometer sensors for motion measurement along three orthogonal axes (tri-axial accelerometers) include, for instance, the MEMS accelerometers of STMicroelectronics series LIS344ALH, LIS3DSH.

The accelerometer sensor 4 measures the accelerations $a_X$, $a_Y$, $a_Z$ of the portion 51 so that the processing unit 10, which receives from the accelerometer sensor 4 data concerning the accelerations $a_X$, $a_Y$, $a_Z$, is capable of calculating the bending angle α of the workpiece 50 as a function of the accelerations $a_X$, $a_Y$, $a_Z$, which include at least components of the gravity acceleration g caused by the gravitational force acting on the accelerometer sensor 4.

In a preferred embodiment, the accelerometer sensor 4 measures the accelerations acting on the portion 51 (linear acceleration along the three orthogonal axes X; Y; Z) when the latter is substantially motionless, at least after bending and preferably before and after bending. In this case, the accelerations $a_X$, $a_Y$, $a_Z$ are approximately static accelerations comprising only the components of the gravity acceleration g (gravity acceleration components). More precisely, the portion 51 is substantially motionless when the angular velocities thereof are approximately equal to zero and therefore the dynamic accelerations (dynamic acceleration components), i.e. tangential acceleration and centripetal acceleration, acting on the portion 51, are close to zero or approximately equal to zero and can be disregarded.

With reference to the example shown in FIG. 11, the motion sensor unit 2 of the apparatus 1 is fixed to a lower surface of the portion 51 of the workpiece 50 so that the X axis is parallel to a transverse edge 51b of portion 51, the Y axis is parallel to the longitudinal edge 51a of portion 51 and the Z axis is orthogonal to the lower surface of portion 51. The apparatus 1 is connected with a bending machine 100 (press brake) provided with a mobile upper punch 101 and a fixed lower die 102, the punch 102 moving vertically against the die 102 for bending or folding the workpiece 50, so that the two opposite portions 51, 52 thereof are bent and form a bending angle α having a predefined and desired value.

The embodiment of the apparatus 1 of the invention described above functions as follows.

The motion sensor unit 2 of the apparatus 1 is manually fastened to one of the portions 51, 52 of the workpiece 50 (for instance the portion 51) using the coupling device 12.

In this initial step the accelerometer sensor 4 measures the initial linear accelerations $a_{X0}$, $a_{Y0}$, $a_{Z0}$ of the portion 51. Since the latter is substantially motionless, such initial linear accelerations $a_{X0}$, $a_{Y0}$, $a_{Z0}$ correspond to the components of the gravity acceleration g caused by the gravitational force acting on the accelerometer sensor 4 associated with the portion 52 that is unfolded:

$a_{X0} = g \operatorname{sen} \beta_0$
$a_{Y0} = 0$
$a_{Z0} = g \cos \beta_0$ wherein g (m/s²) is the gravity acceleration and $\beta_0$ (deg) is the initial rotation angle between the portion 51 and a horizontal reference plane H.

The accelerometer sensor 4 provides the values of the initial linear accelerations $a_{X0}$, $a_{Y0}$, $a_{Z0}$, so that it is possible to calculate the value of the initial rotation angle $\beta_0$.

Therefore, the accelerometer sensor 4 makes it possible to check the correct position of the workpiece 50 over the die 102 before bending, namely to verify if the workpiece 50 is horizontal (angle $\beta_0=0$) as required.

During bending, the workpiece 50 is bent along a bending line F and the two portions 51, 52 are progressively folded closer to each other till they form a predefined bending angle α that depends on the shape and dimension of the punch 101 and die 102 and the position of the punch 101.

After bending, when the portion 51 that carries the motion sensor unit 2 is substantially motionless, the accelerometer sensor 4 measures the final linear accelerations $a_{X1}$, $a_{Y1}$, $a_{Z1}$ of the portion 51. Since the latter is substantially motionless, such final linear accelerations $a_{X1}$, $a_{Y1}$, $a_{Z1}$ correspond to the components of the gravity acceleration caused by the gravitational force acting on the accelerometer sensor 4 associated with the portion 51 that is folded:

$a_{X1}$=g sen $\beta_1$
$a_{Y1}$=0
$a_{Z1}$=g cos $\beta_1$ wherein g (m/s²) is the gravity acceleration and $\beta_1$ (deg) is the final rotation angle between the portion 51 and a reference plane H and can be calculated from the values of the final linear accelerations $a_{X1}$, $a_{Y1}$, $a_{Z1}$ measured by the accelerometer sensor 4.

The bending angle α can be calculated as a function of the initial and final linear accelerations, in particular of the rotation angles $\beta_0$, $\beta_1$ of the portion 51, as follows:

$$\alpha=180°-2(\beta_1-\beta_0)$$

(assuming that the further portion 52 forms the same rotation angle ($\beta_0-\beta_1$) with the horizontal reference plane H, the workpiece 50 being bent symmetrically with respect to a vertical plane passing through the bending line F)

If the motion sensor unit 2 is mounted on the portion 51 with the Y axis out of alignment with the folding line F, the linear accelerations $a_{Y0}$, $a_{Y1}$ along the Y axis are non-zero and the rotation angle β between the portion 51 and the reference plane H (and thus the bending angle α) can be calculated as a function of the three linear accelerations along the three orthogonal axes.

After bending, the value of the bending angle α is sent to the control unit 120. If such measured bending angle α for example is smaller than a reference and required bending angle, additional bending is provided (i.e. an additional vertical movement of the punch 101) in order to further bend the workpiece 50 and obtain the required bending angle. In other words, the apparatus 1 of the invention allows a closed-loop control of the bending operation, in particular of the operation of the bending tools 101, 102.

Alternatively, the accelerometer sensor 4 can measure the accelerations acting on the portion 51 during the entire bending of the workpiece 50, i.e. while the portion 51 is progressively bent by the bending tools 101,102. In this case, the (linear) accelerations $a_X$, $a_Y$, $a_Z$ along the three orthogonal axes besides the approximately static accelerations (gravity acceleration components) include the dynamic accelerations (tangential, centripetal acceleration) due to the rotation of the portion 51 around the bending line F.

Methods and systems are known for processing and filtering the measured accelerations in order to obtain the values of the approximate static accelerations (i.e. the gravity acceleration components) required for calculating the rotation angle of the portion 51.

For instance, by knowing the linear velocity of the upper punch 101 it is possible to have a good estimation of the rotation velocity of the portion 51 of workpiece 50 that is progressively bent. The rotation velocity of portion 51 affords calculating and discriminating the dynamic acceleration components due to the rotation of portion 51 from the approximately static acceleration components due to the gravity acceleration.

When the accelerometer sensor 4 measures the accelerations $a_X$, $a_Y$, $a_Z$ during the bending of workpiece 50, the data relating to the accelerations can be used by the processing unit 10 for precisely and accurately calculating the bending angle α in real time. Therefore the control unit 120 of the bending machine 100, which receives data concerning the bending angle α in real time, can drive the bending tools 101, 102 according to a feedback or closed-loop control in order to obtain the required bending angle.

A method according to the invention for measuring a bending angle α between two portions 51, 52 of a workpiece 50 in a bending machine, includes using a motion sensor unit 2 provided with an accelerometer sensor 4 and associated with a portion 51, 52 to be bent to measure accelerations $a_X$, $a_Z$ of the portions 51, 52 along at least two orthogonal axes X, Z and calculating the bending angle α as a function of the accelerations $a_X$, $a_Z$. The accelerations $a_X$, $a_Z$ include at least the components of the gravity acceleration caused by the gravitational force acting on the accelerometer sensor 4. Preferably, the accelerometer sensor 4 is a tri-axial accelerometer sensor suitable to sense and measure three (linear) accelerations $a_X$, $a_Y$, $a_Z$ along three orthogonal axes X, Y, Z.

The method includes measuring the accelerations when the portions 51, 52 are substantially motionless so that the accelerations are approximately static accelerations that include only the components of the gravity acceleration g. The portions 51, 52 are substantially motionless when the angular velocity thereof are approximately equal to zero and therefore the dynamic accelerations (dynamic acceleration components), i.e. tangential acceleration and centripetal acceleration, acting on the portions 51, 52 are close to zero or approximately equal to zero and thus can be disregarded.

Thus, the method provides in an initial step of the bending operation (wherein the workpiece 50 is substantially motionless and the portion 51 is unfolded) measuring initial accelerations $a_{X0}$, $a_{Y0}$, $a_{Z0}$ of the portion 51. Such initial accelerations $a_{X0}$, $a_{Y0}$, $a_{Z0}$ correspond to the components of the gravity acceleration:

$a_{X0}$=g sen $\beta_0$
$a_{Y0}$=0
$a_{Z0}$=g cos $\beta_0$ wherein g (m/s²) is the gravity acceleration and $\beta_0$ (deg) is the initial rotation angle between the portion 51 and the horizontal reference plane H.

The method calculates the value of the initial rotation angle $\beta_0$ from the measured initial accelerations $a_{X0}$, $a_{Y0}$, $a_{Z0}$.

During bending, the workpiece 50 is bent along a bending line F and the two portions 51, 52 are progressively folded closer to each other until they form a predefined bending angle α that depends on the shape and dimension of punch 101 and die 102 and the position of the punch 101.

In a final step (wherein the workpiece 50 is substantially motionless and the portion 51 is bent), the method includes measuring final accelerations $a_{X1}$, $a_{Y1}$, $a_{Z1}$ of the portion 51. Such final linear accelerations $a_{X1}$, $a_{Y1}$, $a_{Z1}$ correspond to the components of the gravity acceleration:

$a_{X1}$=g sen $\beta_i$
$a_{Y1}$=0
$a_{Z1}$=g cos $\beta_1$ wherein g (m/s²) is the gravity acceleration and $\beta_1$ (deg) is the final rotation angle between the portion 51 and the horizontal reference plane H.

The method calculates the value of the final rotation angle $\beta_1$ from the values of the measured final linear accelerations $a_{X1}$, $a_{Y1}$, $a_{Z1}$ and then calculate the bending angle α as function of the initial and final linear accelerations, i.e. of the initial and final rotation angles $β_0$, $β_1$, as follows (assuming that the further portion 52 forms the same rotation angle with the reference plane H, the workpiece 50 being bent symmetrically with respect to a vertical plane passing through the bending line F):

$$α=180°-2(β_1+β_0)$$

Furthermore the method according to the invention for measuring the bending angle α between two portions 51, 52 of a workpiece 50 in a bending operation thereof, includes measuring, by means of two motion sensor units 2 provided with respective accelerometer sensors 4 and associated with a portion 51 and a further portion 52 of the workpiece, respective accelerations $a_X$, $a_Z$ of the portions 51, 52 along at least two orthogonal axes X, Z and calculating the bending angle α as a function of the accelerations $a_X$, $a_Z$.

Alternatively, the accelerometer sensor 4 measures the accelerations acting on the portion 51 during the bending of workpiece 50, i.e. while the portions 51, 52 are progressively bent by the bending tools 101,102.

In this case, the accelerations $a_X$, $a_Y$, $a_Z$ along the three orthogonal axes besides the approximately static accelerations (gravity acceleration components) include the dynamic accelerations (tangential, centripetal accelerations) due to the rotation of the portion 51 around the bending line F.

Methods and systems are known for processing and filtering the measured accelerations in order to obtain the values of approximately static accelerations (i.e. the gravity acceleration components) required for calculating the rotation angle of the portion 51.

The embodiment of the apparatus and method of the invention described above allow measuring a bending angle α of a workpiece 50 in a bending machine 100 in a very efficient and economical way. The motion sensor unit 2 of the apparatus 1 can be easily and rapidly fixed by an operator to the portion 51 of the workpiece 50 to be bent.

In the bending operation, for example, and preferably when the workpiece 50 is substantially motionless, the acceleration $a_X$, $a_Y$, $a_Z$ acting on the portion 51 (i.e. the approximately static accelerations corresponding to the components of the gravity acceleration g along the three orthogonal axes) are measured by the accelerometer sensor 4 and transmitted to the processing unit 10 that calculates the bending angle α as a function on the measured linear acceleration $a_X$, $a_Y$, $a_Z$. Therefore, for example, if the measured bending angle α is smaller than a reference bending angle, the control unit 120 of the bending machine 100 (that receives data of the bending angle α from the processing unit 10) can further drive the bending tools 101, 102 according to a closed-loop control in order to further bend the workpiece 50 and obtain the required bending angle.

The motion sensor unit 2 that includes the MEMS accelerometer sensor 4 is an integrated electronic device very low-priced with respect to the known optical measuring systems. It should be noted that the apparatus 1 of the invention is not influenced or affected by the environment of the factory plant or workshop wherein the bending machine is positioned and provides precise and reliable measures even with dust, fifth, grime, oil, etc. The accelerometer sensor 4 can be also shielded against magnetic and/or electromagnetic interferences.

Owing to the very small dimension of the miniature or micro MEMS accelerometer sensor 4 and thus of the motion sensor unit 2, it is possible to also measure the bending angle of a small workpiece 50 of small portions thereof.

The apparatus 1 can be easily and effectively implemented and used in almost all kinds of bending machine.

Figure 12:
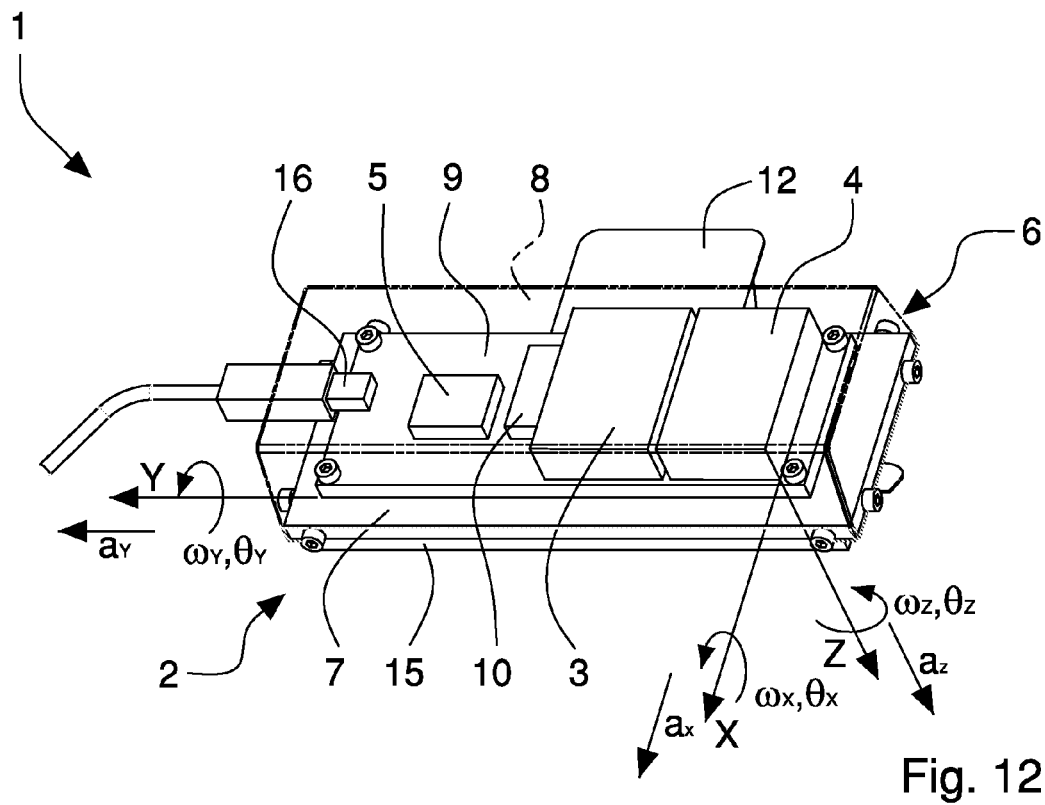
FIG. 12 is top perspective view of a further embodiment of the apparatus of the invention with a cover shown in a dotted line.
Figure 13:
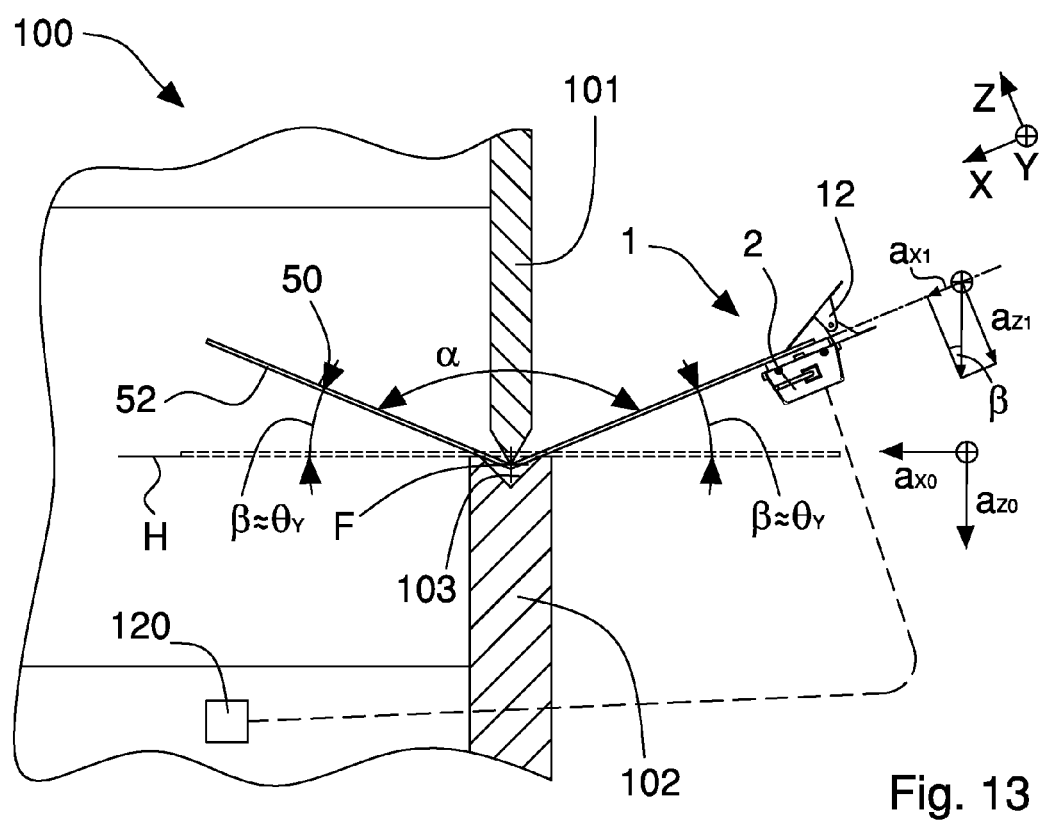
FIG. 13 is schematic side view of the apparatus of FIG. 12 associated with a workpiece and with a bending machine.

With reference to FIGS. 12 and 13, a further embodiment of the apparatus 1 of the invention is provided that differs from the above described embodiments in that the motion sensor unit 2, which is fixed to a portion 51 of the workpiece 50, includes a gyroscope sensor 3 and an accelerometer sensor 4 that are both connected to the process unit 10 and are inertial sensors suitable for measuring angular velocities $ω_X$, $ω_Y$, $ω_Z$ and related rotation angles $θ_X$, $θ_Y$, $θ_Z$ and linear accelerations $a_X$, $a_Z$ according to at least two orthogonal axes X, Z, and preferably according to three orthogonal axes X, Y, Z. The gyroscope sensor 3 and an accelerometer sensor 4 are fixed to the support element 7 of the casing 6.

In this embodiment, the process unit 10 is positioned inside the casing 6 of the motion sensor 2, fixed to the support element 7 and connected to the gyroscope sensor 3 and the accelerometer sensor 4 so as to receive therefrom data concerning angular velocities $ω_X$, $ω_Y$, $ω_Z$, rotation angles $θ_X$, $θ_Y$, $θ_Z$ and linear accelerations $a_X$, $a_Y$, $a_Z$.

In an embodiment of the apparatus not illustrated, the gyroscope sensor 3 and the accelerometer sensor 4 are parts of an integrated inertial sensor. More specifically, the motion sensor unit 2 may include a MEMS inertial measurement unit (IMU), which includes a tri-axial gyroscope sensor 3, a tri-axial accelerometer sensor 4 and optionally other sensors (magnetometer, pressure sensor). Such a MEMS inertial measurement unit is for instance the inertial sensor ADIS16488 of Analog Devices.

With reference to the example shown in FIG. 13, the motion sensor unit 2 of the apparatus 1 is fixed to a lower surface of the portion 51 of the workpiece 50 so that the X axis is parallel to a transverse edge 51b of portion 51, the Y axis is parallel to the longitudinal edge 51a of portion 51 and the Z axis is orthogonal to the lower surface of portion 51. The apparatus 1 is connected with the bending machine 100 (press brake) of FIG. 7.

The apparatus 1 functions as follows.

As already explained above for the apparatus of FIGS. 1 to 6, during bending the gyroscope sensor 3 measures the angular velocities or rotation rates $ω_X$, $ω_Y$, $ω_Z$ and the related rotation angles $θ_X$, $θ_Y$, $θ_Z$ so that the processing unit 10 can calculate the bending angle α as a function of the rotation angle $θ_X$, $θ_Y$, $θ_Z$. In particular, in the illustrated embodiment, the rotation angle β between the portion 51 and the reference plane H substantially corresponds to the rotation angle $θ_Y$ around the Y axis measured by the gyroscope sensor 3 since the Y axis is substantially parallel to the folding line F. Thus, the bending angle α can be calculated as a function of the rotation angle β≈$θ_Y$ (α=180°−2β, assuming that the further portion 52 forms the same rotation angle with the reference plane H, the workpiece 50 being bent symmetrically with respect to a vertical plane passing through the bending line F).

Preferably, the accelerometer sensor 4 measures the linear accelerations $a_X$, $a_Y$, $a_Z$ of the portion 51 that is substantially motionless in an initial step (initial accelerations $a_{X0}$, $a_{Y0}$, $a_{Z0}$ before the bending) and in a final step (final linear accelerations $a_{X1}$, $a_{Y1}$, $a_{Z1}$ after the bending) so that the processing unit 10 can calculate the bending angle α as a function of the accelerations $a_X$, $a_Y$, $a_Z$, as already explained for the apparatus of FIGS. 10 and 11.

In the example of FIG. 13, the two portions 51, 52 are coplanar to each other and to the reference plane H and form an angle of 180°. Thus the initial rotation angle is $β_0$=0 and the values of initial linear accelerations $a_{X0}$, $a_{Y0}$, $a_{Z0}$ are:
$a_{X0}$=0

$a_{Y0}=0$ $a_{Z0}=g$

The initial linear accelerations $a_{X0}$, $a_{Y0}$ along the X axis and Y axis are zero since X axis and Y axis are substantially horizontal and laying on the reference plane H, while the initial linear accelerations $a_{Z0}$ along the Z axis are equal to gravity acceleration g since the Z axis is substantially vertical.

In the final step the final linear accelerations $a_{X1}$, $a_{Y1}$, $a_{Z1}$ correspond to the components of the gravity acceleration:

$a_{X1}=g$ sen $\beta_i$ $a_{Y1}=0$ $a_{Z1}=g$ cos $\beta_1$ wherein g (m/s$^2$) is the gravity acceleration and $\beta_1$ (deg) is the final rotation angle between the portion 51 and a horizontal reference plane H and can be calculated from the values of the final linear accelerations $a_{X1}$, $a_{Y1}$, $a_{Z1}$ measured by the accelerometer sensor 4.

The processing unit 10 compares the values of the bending angle $\alpha$ obtained with both the gyroscope sensor 3 and the accelerometer sensor 4 in order to obtain a more precise and accurate value of the bending angle $\alpha$.

Furthermore, it should be noted that the gyroscope sensor 3 can also be used for controlling the operation of accelerometer sensor 4.

The gyroscope sensor 3 can be used to check when the workpiece 50, and in particular the portion 51, is substantially motionless (when the angular velocities $\omega_X$, $\omega_Y$, $\omega_Z$ are close to zero or zero) so that the accelerometer sensor 4 can be activated for precisely measuring the linear accelerations $a_X$, $a_Y$, $a_Z$, which in this case correspond to the components of the gravity acceleration caused by the gravitational force acting on the accelerometer sensor 4 associated with the portion 51.

The gyroscope sensor 3 detects the rotation movement (rotation angle $\theta_Y$) of portion 51, around an axis (Y-axis) that is parallel to the bending line F, such rotation movement being the only movement allowable since linear movements of the whole workpiece 50 (both vertically and horizontally) are prevented by the lower bending tool (i.e. the die 102 in the bending machine of FIG. 8) and/or by the clamping device (i.e. upper clamp 113 and lower clamp 114 in the bending machine of FIG. 9).

Alternatively, the accelerometer sensor 4 can measure the accelerations acting on the portion 51 during bending of workpiece 50, i.e. while the portion 51 is progressively bent by the bending tools 101, 102.

In this case, the accelerations $a_X$, $a_Y$, $a_Z$ along the three orthogonal axes X, Y, Z besides the approximately static accelerations (gravity acceleration components) include the dynamic accelerations (tangential, centripetal acceleration) due to the rotation of the portion 51 around the bending line F. Nevertheless, the values of such dynamic accelerations can be calculated (and thus discriminated and filtered out) since the gyroscope sensor 3 provides the value of the angular velocities or rotation rates $\omega_X$, $\omega_Y$, $\omega_Z$ and the related rotation angles $\theta_X$, $\theta_Y$, $\theta_Z$ of the portion 41, 52 during bending.

What is claimed is:

1. Apparatus for measuring a bending angle between two portions of a workpiece in a bending machine, comprising
   (a) at least one motion sensor unit including a gyroscope sensor;
   (b) a coupling device for connecting said motion sensor unit with a portion of the workpiece to be bent;
   (c) a processing unit connected with said gyroscope sensor, said gyroscope sensor measuring at least one angular velocity; and
   (d) a processing module calculating from said at least one angular velocity a related rotation angle of said workpiece portion according to an axis during bending of the workpiece, said processing unit receiving data regarding said at least one angular velocity from said processing module and calculating said bending angle as a function of said rotation angle calculated on the basis of said at least one angular velocity.

2. Apparatus according to claim 1, wherein said motion sensor unit further comprises an accelerometer sensor for measuring acceleration acting on the workpiece portion along at least two orthogonal axes, said acceleration comprising at least components of a gravity acceleration caused by gravitational force acting on said accelerometer sensor, said processing unit receiving from said accelerometer sensor data regarding said accelerations in order to control a position of the workpiece portion and/or to calculate said bending angle as a function of said acceleration.

3. Apparatus according to claim 2, wherein said accelerometer sensor comprises at least one of a MEMS accelerometer sensor and a tri-axial accelerometer sensor for measuring accelerations along three orthogonal axes.

4. Apparatus according to claim 2, wherein said motion sensor unit comprises a MEMS inertial measurement unit provided with said gyroscope sensor and said accelerometer sensor.

5. Apparatus according to claim 1, wherein said gyroscope sensor comprises at least one of a micro or miniature gyroscope sensor, and a tri-axial gyroscope sensor for measuring angular velocities and calculating related rotation angles according to three orthogonal axes.

6. Apparatus according to claim 1, wherein said coupling device comprises a fastening device for removably connecting said motion sensor unit with the portion of the workpiece.

7. Apparatus according to claim 1, wherein said coupling device comprises a support assembly mounted on said bending machine and arranged for supporting and maintaining said motion sensor unit in contact and against the portion of the workpiece during the bending operation.

8. Apparatus according to claim 1, wherein said processing unit is connected with one of said motion sensor unit and a control unit of said bending machine.

9. A bending machine, comprising an apparatus for measuring a bending angle between two portions of a workpiece according to claim 1.

10. A bending machine according to claim 9, and further comprising a control unit for controlling operation of bending tools acting on the workpiece in a bending operation, said control unit being connected with said apparatus for receiving data from said apparatus relating to said bending angle in order to control the operation of said bending tools.

11. Apparatus according to claim 1, wherein said gyroscope sensor includes a register and said processing module for registering data concerning said at least one angular velocity and for calculating said related rotation angle.

12. Apparatus for measuring a bending angle between two portions of a workpiece in a bending machine, comprising
   (a) two motion sensor units including respective gyroscope sensors;
   (b) two coupling devices for connecting said motion sensor units with first and second portions of the workpiece to be bent, respectively;

(c) a processing unit connected with said gyroscope sensors, said gyroscope sensors measuring respective angular velocities; and (d) two processing modules calculating from said angular velocities related rotation angles of said first and second workpiece portions according to respective axes during bending of said workpiece, said processing unit receiving data regarding said angular velocities from said processing modules and calculating said bending angle as a function of said rotation angles calculated on the basis of said angular velocities of the first and second workpiece portions.

13. Apparatus according to claim 12, wherein said gyroscope sensors include respective registers and processing modules for registering data concerning said at least one angular velocity and for calculating said related rotation angle.

14. Apparatus according to claim 12, wherein each of said gyroscope sensors comprises at least one of a micro or miniature gyroscope sensor, and a tri-axial gyroscope sensor for measuring angular velocities and calculating related rotation angles according to three orthogonal axes.

15. Apparatus according to claim 12, wherein said processing unit is connected with one of said motion sensor units and a control unit of said bending machine.

16. A bending machine, comprising an apparatus for measuring a bending angle between two portions of a workpiece according to claim 12 and further comprising a control unit for controlling operation of bending tools acting on the workpiece in a bending operation, said control unit being connected with said apparatus for receiving data from said apparatus relating to said bending angle in order to control the operation of said bending tools.

17. A method for measuring a bending angle between two portions of a workpiece in a bending operation thereof, comprising the steps of (a) measuring at least one angular velocity and calculating a related rotation angle of a portion of the workpiece using a motion sensor unit connected with the portion of the workpiece, said motion sensor including a gyroscope sensor; and (b) calculating said bending angle as a function of said rotation angle calculated on the basis of said measured angular velocity.

18. A method according to claim 17, and further comprising the steps of (c) measuring accelerations of the portion of the workpiece along at least two orthogonal axes with an acceleration sensor of said motion sensor unit, said accelerations comprising at least components of a gravity acceleration caused by the gravitational force acting on said accelerometer sensor;

(d) controlling a position of said portion of the workpiece; and (e) calculating said bending angle as a function of said accelerations.

19. A method according to claim 18, and further comprising the steps of controlling a motion of the workpiece with said gyroscope sensor and activating said accelerometer sensor in order to measure said accelerations when said angular velocity is close to zero and said portions of the workpiece are substantially motionless.

* * * * *